(12) United States Patent
Fang et al.

(10) Patent No.: US 8,316,439 B2
(45) Date of Patent: Nov. 20, 2012

(54) ANTI-VIRUS AND FIREWALL SYSTEM

(75) Inventors: Licai Fang, Beijing (CN); Jyshyang Chen, Cupertino, CA (US); Donghui Yang, Beijing (CN)

(73) Assignee: Iyuko Services L.L.C., Dover, DE (US)

( * ) Notice: Subject to any disclaimer, the term of this patent is extended or adjusted under 35 U.S.C. 154(b) by 1003 days.

(21) Appl. No.: 11/804,494

(22) Filed: May 17, 2007

(65) Prior Publication Data

US 2007/0271612 A1 Nov. 22, 2007

Related U.S. Application Data

(60) Provisional application No. 60/801,714, filed on May 19, 2006.

(51) Int. Cl.
*H04L 29/06* (2006.01)
(52) U.S. Cl. ............... 726/22; 726/2; 726/3; 726/12; 726/23; 726/24; 713/192; 713/189; 713/153; 709/238; 709/230; 709/227; 710/268; 710/267; 710/266; 710/100
(58) Field of Classification Search .................. None
See application file for complete search history.

(56) References Cited

U.S. PATENT DOCUMENTS

| | | | |
|---|---|---|---|
| 5,349,682 A | 9/1994 | Rosenberry | 395/800 |
| 6,090,564 A * | 7/2000 | Hillman et al. | 435/7.1 |
| 6,513,057 B1 | 1/2003 | McCrory | 709/102 |
| 6,748,534 B1 * | 6/2004 | Gryaznov et al. | 713/188 |
| 6,928,482 B1 | 8/2005 | Ben Nun et al. | 709/235 |
| 7,472,288 B1 * | 12/2008 | Chou et al. | 713/193 |
| 7,784,678 B2 * | 8/2010 | Kuo et al. | 235/375 |
| 7,805,509 B2 * | 9/2010 | Alon et al. | 709/224 |
| 7,854,006 B1 * | 12/2010 | Andruss et al. | 726/24 |
| 7,861,303 B2 * | 12/2010 | Kouznetsov et al. | 726/24 |
| 7,870,612 B2 * | 1/2011 | Liu | 726/24 |
| 7,904,957 B2 * | 3/2011 | Imai | 726/22 |
| 7,984,503 B2 * | 7/2011 | Edwards | 726/24 |
| 8,032,250 B2 * | 10/2011 | Farchmin et al. | 700/221 |
| 8,091,133 B2 * | 1/2012 | Kim et al. | 726/23 |

(Continued)

FOREIGN PATENT DOCUMENTS

EP 0384635 8/1990

(Continued)

OTHER PUBLICATIONS

Extended European Search Report received in European Application No. 07009926.2 dated Aug. 19, 2008 (15 pages).

(Continued)

*Primary Examiner* — Syed A. Zia

(57) ABSTRACT

An anti-virus system for enforcing a virus monitoring and scanning process, the anti-virus and firewall system comprises a master CPU card, a plurality of slave CPU cards and a programmable logic. The master CPU card is used for controlling the virus monitoring and scanning process and dividing the virus monitoring and scanning process into a plurality of sub-processes. The plurality of slave CPU cards are controlled by the master CPU card in a software level and a hardware level, each of the plurality of slave CPU cards receives and processes one of the plurality of sub-processes then sends back to the master CPU card. The programmable logic controlled by the master CPU card for monitoring and controlling said plurality of slave CPU cards at a hardware level.

17 Claims, 2 Drawing Sheets

U.S. PATENT DOCUMENTS

| | | | |
|---|---|---|---|
| 8,132,257 B2 * | 3/2012 | Li et al. | 726/22 |
| 8,171,552 B1 * | 5/2012 | Chang | 726/24 |
| 8,201,253 B1 * | 6/2012 | Yan et al. | 726/24 |
| 2003/0009532 A1 | 1/2003 | Otte | 709/213 |
| 2003/0033479 A1 | 2/2003 | Gruner | 711/118 |
| 2005/0050359 A1 * | 3/2005 | Liang | 713/201 |
| 2005/0071843 A1 | 3/2005 | Guo | 718/101 |
| 2005/0086499 A1 * | 4/2005 | Hoefelmeyer et al. | 713/188 |
| 2006/0101180 A1 | 5/2006 | Tuppa | 710/260 |
| 2006/0236127 A1 * | 10/2006 | Kurien et al. | 713/193 |
| 2007/0150657 A1 * | 6/2007 | Yigzaw et al. | 711/128 |
| 2011/0225649 A1 * | 9/2011 | Bhogal et al. | 726/22 |

FOREIGN PATENT DOCUMENTS

| | | |
|---|---|---|
| EP | 0658837 | 6/1995 |
| EP | 1392035 A2 | 8/2003 |
| EP | 1392035 | 2/2004 |
| TW | 454145 B | 9/2001 |
| WO | WO 9533237 | 12/1995 |
| WO | WO 02/03220 | 1/2002 |
| WO | WO 02/15027 | 2/2002 |
| WO | 2004019571 A3 | 3/2004 |
| WO | WO 2004/019571 | 3/2004 |

OTHER PUBLICATIONS

"Cisco Multiprocessor WAN Application Mode", Cisco Products Internet Page, Jun. 11, 2004 (6 pages).

"Programmable Logic Device" Wikipedia, May 9, 2006 (4 pages).

"Joint Test Action Group" Wikipedia, Apr. 29, 2006 (4 pages).

\* cited by examiner

ANTI-VIRUS AND FIREWALL SYSTEM

CROSS REFERENCE TO PROVISIONAL APPLICATION

This application claims the benefit of U.S. Provisional Patent Application Ser. No. 60/801,714, entitled "Anti-Virus System," filed on May 19, 2006, the specification of which is hereby incorporated in its entirety by reference.

TECHNICAL FIELD

The invention relates to an anti-virus and firewall system, and more particularly, to an anti-virus and firewall system with multi-coprocessor.

BACKGROUND ART

With the popularization of Internet technologies and applications, millions of users are connecting to the Internet daily to conduct e-commerce transactions or perform searches for information. The interaction between these users and external host servers on the Internet involves the transfer of data, which may include various computer viruses.

To combat viruses, users and administrators of computer networks have employed a variety of tools, such as anti-virus programs and firewalls, which are created to detect and block viruses from infecting associated computer system. One capability of many conventional anti-virus programs is to perform virus checking on virus-susceptible computer files when receiving them. A popular method for detecting viruses in computers, employed in many anti-virus products, is called "scanning." During scanning, a scanner scans the potential hosts for a set of one or more specific patterns of code called "signatures" that are indicative of particular known viruses or virus families. Obviously, the scanning speed of the anti-virus system used for blocking viruses will directly influence the network speed.

Conventional anti-virus systems rely on a single Central Processing Unit (CPU) to support virus scanning processes that control and perform arithmetic and logical operations involved in procuring the virus sample, implementing the virus analysis, generating the appropriate cures, and deploying them to the end users. When the amount of data that needs to be examined is too great, the single CPU of conventional systems may be too heavily burdened to perform with high efficiency. A single higher frequency processor or two-core processor may be used to facilitate better firewall and anti-virus performance. However, when the anti-virus function is implemented, the CPU will be slowed down and efficiency reduced.

Furthermore, a virtual-machine may be used for implementing anti-virus functions in order to protect a computer system from being crashed. The virtual-machine is a protected memory space that is created through the processor's hardware capabilities to emulate the performance of a hardware device. In prior art, in order to run or perform the virtual machine, software is used to interpretively execute a program, and then determine whether viruses are present by checking the state of the program. However, running a virtual-machine through memories of a CPU may further lower speeds and using software based systems to handle anti-virus operations may lower performance.

In some industrial computing applications, for achieving stable and reliable communication, a standard Compact Peripheral Component Interface (CompactPCI) platform or other industrial standard backplane based system may be used. The CompactPCI is an adaptation of the Peripheral Component Interconnect (PCI) specification for industrial computer applications. Although the CompactPCI is suited for small, high-speed industrial computing applications where transfers occur between a number of high-speed cards, the use of the CompactPCI leads to high costs.

There is thus a need in the art for an optimal anti-virus system that overcomes at least the aforementioned shortcomings in the art. In particular, a need exists in the art for an optimal anti-virus system with high efficiency and low cost.

SUMMARY OF THE INVENTION

An anti-virus system for enforcing a virus monitoring and scanning process, the anti-virus and firewall system comprises a master CPU card, a plurality of slave CPU cards and a programmable logic. The master CPU card is used for controlling the virus monitoring and scanning process and dividing the virus monitoring and scanning process into a plurality of sub-processes. The plurality of slave CPU cards are controlled by the master CPU card in a software level and a hardware level, each of the plurality of slave CPU cards receives and processes one of the plurality of sub-processes then sends back to the master CPU card. The programmable logic controlled by the master CPU card for monitoring and controlling the plurality of slave CPU cards at a hardware level.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

DESCRIPTION OF THE EMBODIMENT

Reference will now be made in detail to the embodiments of the present invention, anti-virus and firewall system. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
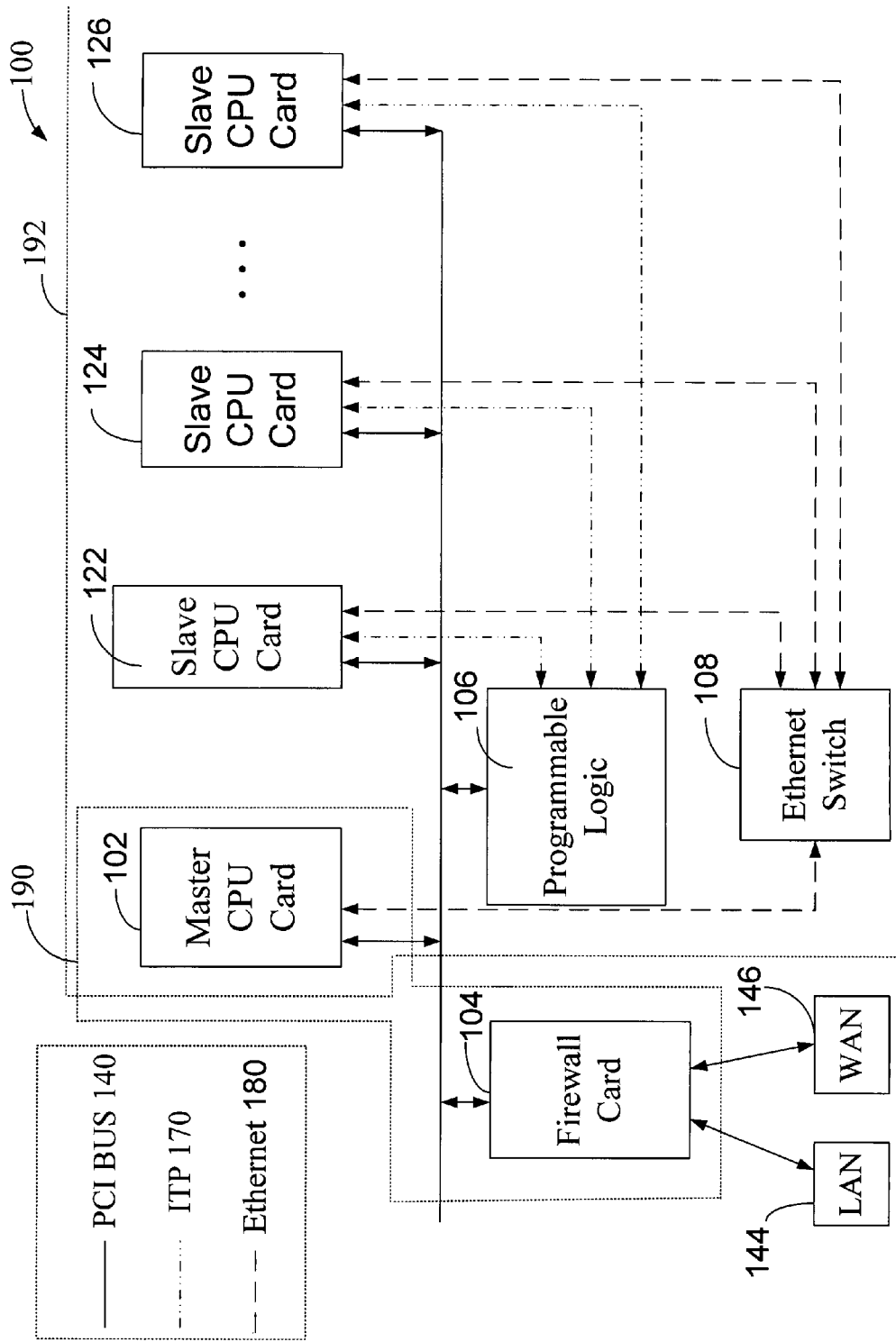
FIG. 1 is a diagram showing an anti-virus and firewall system based on multi-coprocessors in accordance with one embodiment of the present invention.

Referring to FIG. 1, an anti-virus and firewall system 100 having multi-coprocessors according to one embodiment of the present invention is illustrated. The anti-virus and firewall system 100 comprises an anti-virus system 192 and a firewall system 190, both of which are controlled by a master CPU card 102. The anti-virus system 192 further comprises three slave CPU cards 122, 124, 126, a programmable logic 106 and an Ethernet switch 108. The firewall system further comprises a firewall card 104 coupled to a Local Area Network (LAN) 144 and a Wide Area Network (WAN) 146.

For clarity, three slave CPU cards are shown in FIG. 1 and will be described in detail hereinafter. However, it will be apparent to those skilled in the art that more than three slave CPU cards can be included in the anti-virus and firewall system 100.

In the anti-virus system 192, the master CPU card 102, the slave CPU cards 122, 124, and 126, the programmable logic 106 and the Ethernet switch 108 are coupled through different buses or debug tool. The master CPU card 102 and the slave CPU cards 122, 124 and 126 are all processors used for enforcing an anti-virus policy, such as monitoring data traffic and scanning incoming files while the users of LAN 144 are accessing the WAN 146. The master CPU card 102 is a general controller which is coupled to the slave CPU cards 122, 124, and 126 through Ethernet 180 and PCI bus 140 for sharing loads among multi-coprocessors according to one embodiment of present invention. In other words, the master CPU card 102 is used for controlling the whole anti-virus process and dividing the detailed monitoring or scanning process into sub-processes and assigning those sub-processes to the slave CPU cards 122, 124 and 126.

As mentioned above, the master CPU card 102 is coupled with the slave CPU cards 122, 124, and 126 through Ethernet 180 and PCI bus 140, which can be used in different situations. In one embodiment of the present invention, the PCI bus 140 is used as a control bus, which transmits control information between the master CPU card 102 and the slave CPU cards. When the master CPU card 102 is enforcing or executing the anti-virus process, it sends out control signals to the slave CPU cards 122, 124 and 126 to allow the slave CPU cards to be prepared for receiving data packets. At the same time, the lengths of data packets which should be processed are also sent to the slave CPU cards through PCI bus 140. After the slave CPU cards 122, 124 and 126 finishes processing the data, the master CPU card 102 will send control signals to allow the slave CPU cards 122, 124 and 126 to transmit the data back.

While the control bus PCI bus 140 carries the control information between the master CPU card 102 and the slave CPU cards, the Ethernet 180 serves as a data bus which carries actual data that is being processed. After the master CPU card 102 sends out the control signals, the data which is being processed will be transmitted to the slave CPU cards 122, 124 and 126 through the Ethernet 180. When data processing is finished by the slave CPU cards 122, 124 and 126, a complete signal will be sent to the master CPU card 102 and then the master CPU card 102 can send a control signal to allow the resultant data to be transmitted back to the master CPU card 102 through the Ethernet 180.

The Ethernet switch 108 is used to couple the lines of the Ethernet 180 together. Besides making the anti-virus system integral, as well as maximizing network performance and flexibility, the Ethernet switch 108 also can provide increased bandwidth, improved performance and reliability in high availability applications, such as defense, IP telephony and broadband.

It will be apparent to those skilled in the art that other buses in various bus standards can be used to serve as a control bus and a data bus in place of the PCI bus 140 and the Ethernet 180, in accordance with other embodiments of the present invention. Further, in accordance with one embodiment of the present invention, one kind of bus can be used to transmit both control signals and data, or in other words, the control signals and the data which is being processed can be transmitted using one kind of bus.

Furthermore, when the slave CPU cards 122, 124, and 126 are used for processing the virus monitoring and scanning sub-processes, the slave CPU cards 122, 124, and 126 can run the sub-processes by themselves. Alternatively, in another embodiment, the slave CPU cards 122, 124, and 126 can make the adjacent slave CPU card work as a coprocessor through the PCI bus 140.

It should be noted that the spirit of one embodiment of the present invention is using multi-coprocessors to process the anti-virus session so as to accelerate the monitoring and scanning performance. Compared with the anti-virus system in the prior art which used one single high frequency processor or two-core processor, the multi-coprocessor anti-virus system according to one embodiment of the present invention is able to accelerate the performance and reduce cost of the computer system.

In one embodiment, the anti-virus system 192 may be used in a network gateway. Since the network speed is directly influenced by the scanning speed of the anti-virus system used for blocking and scanning viruses in the gateway, the wire speed can be up to a hundred Mbps from a few Mbps by using the multi-coprocessor anti-virus system according to one embodiment of the present invention.

The programmable logic 106 may be used for monitoring and controlling the slave CPU cards 122, 124 and 126 and may be coupled to the master CPU card 102 by PCI bus 140. In accordance with one embodiment of the present invention, the control part of the programmable logic 106 is realized by a Field Programmable Gate Array (FPGA) or a Complex Programmable Logic Device (CPLD) with Hardware Description Language.

In one embodiment, the programmable logic 106 comprises an In-Target Probe (ITP) debug tool (not shown) which can be, but is not limited to, the ITP-700 available commercially from Intel® Corporation. The ITP debug tool has a debug port 170, which is the command and control interface of the ITP debug tool. The programmable logic 106 controls the slave CPU cards 122, 124 and 126 through the ITP debug port 170 of the ITP debug tool. The target program or data which need to be checked can be sent to the slave CPU card 122, 124, or 126, and the slave CPU card 122, 124, or 126 can run or execute the target program. The process state of the slave CPU cards 122, 124 and 126, such as setting break point, watching and modifying variables, memories, or registers can be controlled by the master CPU card 102 through programmable logic 106.

Furthermore, the ITP debug tool is a specialized Joint Test Access Group (JTAG) Test Access Port (TAP) bus master, which complies with the IEEE 1149-1 standard and interfaces into processors and chipset TAP agents through a carefully routed private scan chain. Since the TAP interface is allowed to query and edit registers of the slave CPU cards 122, 124 and 126, the programmable logic 106 can provide a more reliable control for the master CPU card 102, compared with only using the PCI bus 140 to control the slave CPU cards 122, 124 and 126. In other words, the master CPU card 102 controls the slave CPU cards 122, 124 and 126 through the Ethernet 180 and\or the programmable logic 106 according different levels.

For example, the slave CPU cards 122, 124 and 126 can be used to run or execute a checking virus process, or run a target program which needs to be checked. Under those circumstances, if the running process gets stuck for some reason, the master CPU card 102 can neither give control information to the slave CPU cards 122, 124 and 126 through the PCI bus 140 nor get information from the slave CPU cards 122, 124 and 126 because the control of the master CPU card 102 through the PCI bus 140 is at the software level. However, since the programmable logic 106 comprising the ITP debug tool which can interface into the slave CPU cards 122, 124, and 126 and directly query and edit registers of the CPU slave cards 122, 124, and 126, the master CPU card 102 controls the slave CPU cards 122, 124, and 126 at the hardware level and is able to send control signals to the slave CPU cards 122, 124 and 126 through the programmable logic 106.

In accordance with one embodiment of the present invention, when the programmable logic 106 is enabled, it will monitor the status of the slave CPU cards 122, 124 and 126. The programmable logic 106 gets the status information at intervals of predetermined period of time, whether the master CPU card 102 sends control signals to programmable logic 106 or not. If any one of the slave CPU cards 122, 124 and 126 does not work in a normal state, the master CPI card 102 will give control signals, such as the signal to restart the process, to the programmable logic 106 and then the programmable logic 106 will directly control the slave CPU cards 122, 124 and 126 through the ITP debug tool at the hardware level. When the slave CPU cards 122, 124 and 126 are working in normal state, the master CPU card 102 also can control the anti-virus process of the slave CPU cards 122, 124 and 126 through the programmable logic 106, such as setting break point in the anti-virus program, or modifying memories or registers of the slave CPU cards 122, 124 and 126.

It will be apparent to those skilled in the art that other debug tool can be used in the programmable logic 106 to directly control the slave CPU cards 122, 124 and 126 at the hardware level in place of the ITP-700 of the Intel® Corporation.

In an embodiment of the present invention, the above mentioned anti-virus system 192 is provided to run a virtual machine so as to emulate the performance of a computer system for determining whether viruses are present in a software code, a program or any data. As mentioned above, software is used to interpretively execute programs in prior art, and during the interpretive process, the anti-virus program will be firstly run ran in the memories which are is emulated as virtual registers, then run in the real registers of the processor. When the anti-virus system 192 runs the virtual machine, the anti-virus program will be directly run in the registers of the slave CPU cards 122, 124 and 126. It is apparent to those skilled in the art that the anti-virus program running through the registers of CPU card is faster than running through the memories of CPU.

Furthermore, the programmable logic 106 is used for monitoring and controlling the running of the virtual machine in slave CPU cards 122, 124 and 126 as detailed above. During the running of the virtual machine, the master CPU card 102 can watch the software code or program by means of other control processes or procedure, such as setting break points to avoid the crashing of the anti-virus system 192 which is running as the virtual machine.

Compared with a virtual machine in the prior art which is emulated by software, the anti-virus system of one embodiment which uses multi-coprocessors to implement the anti-virus system and emulate the virtual machine in the CPU cards according to one embodiment of the present invention is able to increase the performance and reduce cost of the anti-virus system.

In the firewall system 190 which is designed to prevent unauthorized users or data packets of WAN 146 from accessing the LAN 144, the master CPU card 102 is operated as a controller and is coupled to the firewall card 104 through PCI bus 140. All messages entering or leaving the LAN 144 are transmitted through the firewall system 190. The firewall system 190 is considered to be a first line of defense in protecting private information.

It will be apparent for those skilled in the art that there are several types of firewall techniques, such as packet filter, application gateway, circuit-level gateway, and proxy server, etc. The firewall system 190 can use any type of firewall technique or the combinations thereof.

Therefore, the anti-virus and firewall system 100 can prevent data packets or unauthorized users of WAN 146 from transmitting into or accessing the LAN 144 by the firewall system 190, and also can examine or check the programs or packets for a virus using the anti-virus system 192. All data entering or leaving the LAN 144 is detected by the anti-virus and firewall system 100. Thus, the users or computer systems in the LAN 144 can be protected from unauthorized accessing and the viruses of the WAN 146.

Furthermore, in accordance with one embodiment of the present invention, the anti-virus and firewall system 100 also can serve as a common multi-coprocessor computer system used for processing a common target task. The master CPU card 102 can divide the target task into several sub-tasks and assign them to the slave CPU cards 122, 124 and 126. Thus, the anti-virus system 192 can be used in other applications.

Figure 2:
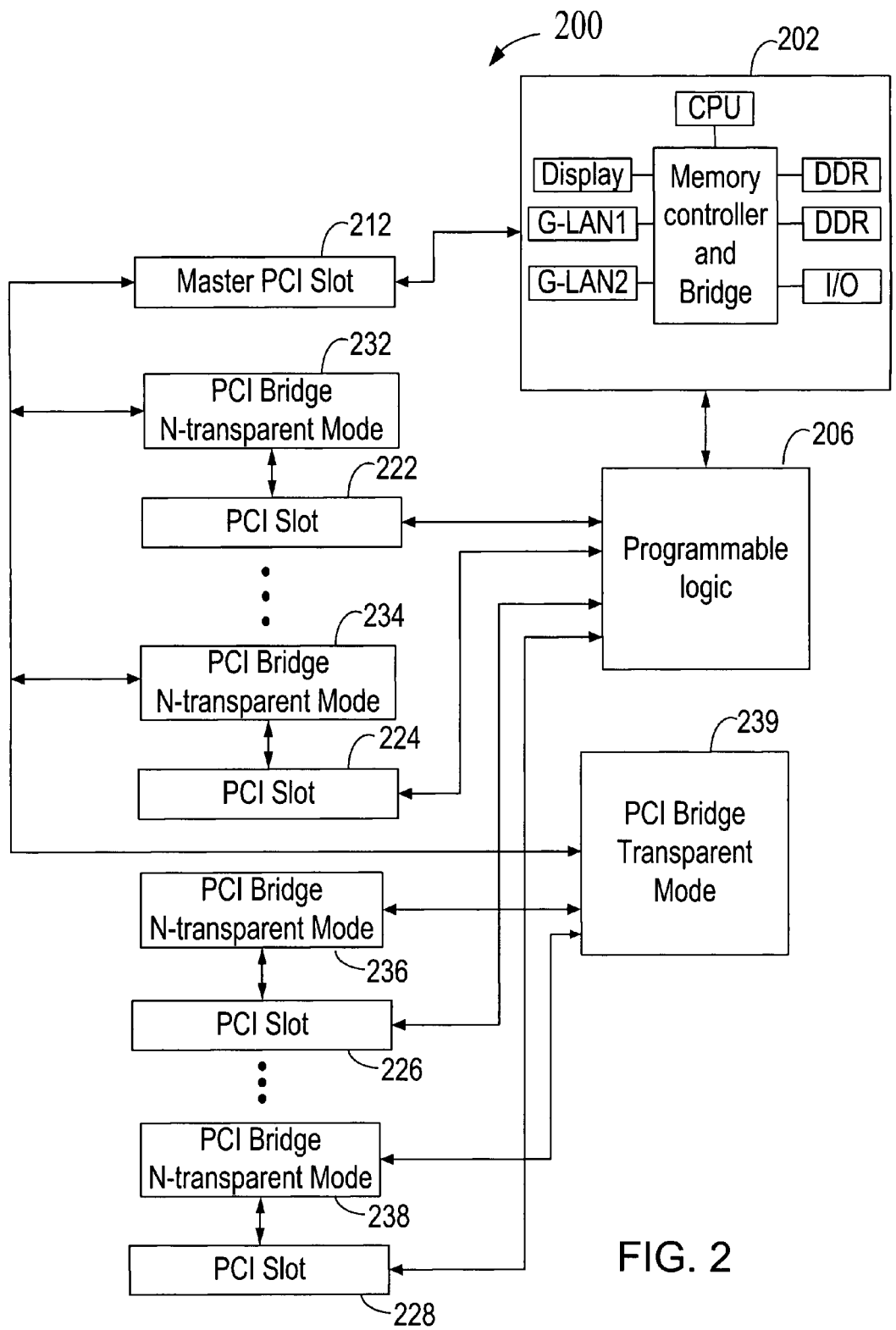
FIG. 2 is a detailed block diagram showing an industrial PCI platform system based on multi-coprocessors in accordance with one embodiment of the present invention.

Referring to FIG. 2, a detailed block diagram showing an industrial PCI platform 200 comprising multi-coprocessors according to one embodiment of the present invention is illustrated. Designed mainly for the industrial/embedded computer industry, the industrial PCI platform 200 also employs the master-slave structure which is similar to the anti-virus system 192 described in detail hereinabove.

As shown in FIG. 2, a master CPU card 202 associated with a master PCI slot 212 and a transparent mode PCI bridge 239 serves as a general controller which is similar to the master CPU card 102 in FIG. 1, and a plurality of CPU cards (not shown) associated with peripheral PCI slots 222, 224, 226 and 228 serve as slave CPU cards coupled to the master CPU card 202 through non-transparent mode PCI bridges 232, 234, 236 and 238. A programmable logic 206 which is similar to the programmable logic 106 in FIG. 1 is coupled to the master CPU card 202 and the peripheral PCI slots 222, 224, 226 and 228 for controlling the slave CPU cards.

In accordance with one embodiment of the present invention, the master CPU card 202 is plugged into the master PCI slot 212 and cooperates with transparent mode PCI bridge 239 to serve as a master CPU card for controlling and driving the slave CPU cards. The master CPU card 202 is a computer board for expanding the memory, speed, bandwidth, or embedded applications of the existing computer system. Since CPU cards are specified by CPU speed, bus type, and applications built into the CPU card as well as other features, the master CPU card 202 in accordance with one embodiment of the present invention is a PCI card. The master CPU card 202 is a PCI CPU card according to one embodiment of present invention, and includes a CPU, memory controller and bridge, display terminal, G-LAN1, G-LAN2, DDR and Input/Output devices. Those skilled in the art should appreciate that those devices of the master CPU card 202 shown in FIG. 2 should be taken as an example, but not limitation. The master CPU card 202 may comprise more or less devices than those devices.

The master PCI slot 212 is used for receiving the master CPU card 202 so as to allow the master CPU card 202 to access the PCI bus. The peripheral PCI slots 222, 224, 226 and 228 are used for receiving the slave CPU cards so as to allow the slave CPU cards to access the PCI bus. In one embodiment, the master PCI card 202 and slave CPU cards may be inserted in the PCI slots 212, 222, 224, 226 and 228 with gold fingers.

The master CPU card 202 can directly control only a limited quantity of PCI slots through master PCI slot 212. The transparent mode PCI bridge 239 is used to couple the non-transparent mode PCI slot 236 and 238 to the master PCI slot 212 such that the master PCI slot 212 can additionally control the non-transparent mode PCI slot 236 and 238 through the transparent mode PCI bridge 239. The transparent mode PCI bridge 239 is used to extend the PCI bus beyond the allowed control capability and physical distance for a simple bus of the PCI specification. Also, the transparent mode PCI bridge 239 appears invisible to software running in the master CPU card 202. The master CPU card 102 is plugged into the master PCI slot 212 and cooperates with the transparent mode PCI bridge 239 for controlling and driving the slave CPU cards.

The non-transparent mode PCI bridges 232, 234, 236 and 238 are used to couple together two PCI buses that are managed by separate CPU cards. Taking the non-transparent mode PCI bridge 232 as an example, two PCI buses are coupled to the non-transparent mode PCI bridge 232. In other words, the non-transparent mode PCI bridge 232 is coupled to the master PCI slot 212 through one PCI bus which is managed by the master CPU card 202, and coupled to the slave or peripheral PCI slot 222 through the other PCI bus which is managed by a slave CPU card (not shown). The non-transparent mode PCI bridge 232 is used for coupling the master PCI slot 212 as well as the master CPU card 202 to the slave PCI slot 222. Through the non-transparent mode PCI bridges on the platform, the master CPU card 202 can communicate with the CPU cards plugged into the slave or peripheral PCI slots 222, 224, 226 and 228.

A CPU card, not shown, can be plugged into one of the peripheral PCI slots 222, 224, 226, 228 to cooperate with the non-transparent mode PCI bridges 232, 234, 236, 238 and to serve as one slave CPU card. In other words, a CPU card associated with the peripheral PCI slot 222 and the non-transparent mode PCI bridge 232 can serve as a slave CPU card. Similarly, a second CPU card associated with the peripheral PCI slot 224 and the non-transparent mode PCI bridge 234 serves as a second slave CPU card; a third CPU card associated with the peripheral PCI slot 226 and the non-transparent mode PCI bridge 236 serves as a third slave CPU card; and a fourth CPU card associated with the peripheral PCI slot 228 and the non-transparent mode PCI bridge 238 serves as a fourth slave CPU card.

For clarity, four peripheral slave CPU card slots and four non-transparent mode PCI bridges are shown in FIG. 2. However, it will be apparent to those skilled in the art that more than four peripheral slave CPU card slots and slave CPU cards can be included in the industrial PCI platform 200.

The programmable logic 206 is used for monitoring and controlling the slave CPU cards by the master CPU card 202 through a PCI bus as detailed above. Similar to the programmable logic 106 in FIG. 1, the programmable logic 206 also comprises the ITP debug tool which includes a debug port so as to directly control the plurality of CPU cards through the peripheral PCI slots 222, 224, 226 and 228. By controlling directly the slave CPU cards, the processing speed of the industrial PCI platform 200 can be accelerated. Compared with the CompactPCI, the industrial PCI platform 200 can also provide stable and reliable communication for industrial computing applications without the high cost.

In accordance to one embodiment of the present invention, the industrial PCI platform 200 may be used in industrial anti-virus applications, and the virtual machine also can run in the industrial anti-virus system which may work similar to the anti-virus and firewall system 100.

Furthermore, in accordance with one embodiment of the present invention, a plurality of general CPU cards can be used in the industrial PCI platform 200. This multi-coprocessor computer system, for example, can be used to form an anti-virus computer system which is similar to the anti-virus and firewall system 100 shown in FIG. 1. The multi-coprocessor computer system can be implemented by using common industry applications and common CPU cards to save cost.

While the foregoing description and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A system, comprising:
   a control unit configured to divide a target object to be tested for malware into a plurality of portions; and
   a plurality of processing units coupled to said control unit, wherein each of said processing units is configured to receive a respective portion of the divided target object to be tested for malware; and
   a hardware programmable logic controlled by said control unit, wherein said hardware programmable logic is configured to monitor a status of said processing units and receive status information from said processing units;
   wherein said control unit and said processing units are configured to run at least one virtual machine, wherein the at least one virtual machine performs a malware monitoring and scanning process on the respective portions of the divided target object.

2. The system in claim 1,
   wherein said hardware programmable logic further comprises a debug tool coupled to said processing units, and wherein said control unit controls said processing units through said debug tool by directly modifying a plurality of registers of said processing units.

3. The system in claim 2, wherein said control unit enables said hardware programmable logic to control said processing units through said debug tool when said control bus is disabled.

4. The system in claim 1, wherein each of said processing units performs a malware testing process on a respective portion of the divided target object.

5. The system in claim 1, wherein the divided target object comprises program code or data.

6. The system in claim 1, wherein each of said processing units is configured to make another of said processing units function as a coprocessor.

7. A system, comprising:
   a control unit configured to divide a target object to be tested for malware into a plurality of portions;
   a plurality of processing units coupled to said control unit and controlled by said control unit, wherein each of said processing units is configured to perform a respective malware scanning process on a respective portion of the divided target object under control of said control unit; and a hardware programmable logic controlled by said control unit, wherein said hardware programmable logic is configured to monitor a status of said processing units and receive status information from said processing units;

wherein said control unit and said processing units are configured to run at least one virtual machine, wherein the at least one virtual machine performs said malware scanning process on the respective portions of the divided target object.

8. The system in claim 7, wherein each of said processing units is configured to make another of said processing units function as a coprocessor.

9. The system in claim 7, further comprising:

a firewall unit controlled by said control unit, wherein the firewall unit is configured to block unauthorized data packets transmitted between a Wide Area Network (WAN) and a Local Area Network (LAN).

10. A system, comprising:

a PCI bus;

a master PCI slot coupled to said PCI bus and configured to receive a control unit, wherein said control unit is configured to divide a target object to be subjected to a target task into a plurality of portions;

a plurality of slave PCI slots coupled to said PCI bus and configured to receive a plurality of processing units, wherein said control unit is configured to control the processing units through said PCI bus to perform said target task, and wherein each of said processing units is configured to receive a respective portion of the divided target object to be subjected to the target task; and a hardware programmable logic controlled by said control unit, wherein said hardware programmable logic is configured to monitor a status of said processing units and receive status information from said processing units;

wherein said control unit and said processing units are configured to run at least one virtual machine, wherein the at least one virtual machine performs the target task on the respective portions of the divided target object.

11. The system in claim 10, wherein said PCI bus further comprises:

at least one transparent mode PCI bridge coupled to said PCI slots.

12. The system in claim 10, wherein said PCI bus further comprises:

a plurality of non-transparent mode PCI bridges which couple said PCI slots to said PCI bus.

13. The system in claim 10, wherein each of said processing units is configured to make another of said processing units function as a coprocessor.

14. The system in claim 10, wherein at least one virtual machine is run on said control unit and said processing units.

15. A multi-coprocessor system, comprising:

a master processor configured to divide a target object to be subjected to a target task into a plurality of portions;

a plurality of slave processors communicatively coupled to said master processor and configured to be controlled by said master processor, wherein a slave processor is configured to receive a respective portion of the divided target object to be subjected to the target task, perform the target task on the respective portion of the target object, and send a respective result of the target task to said master processor; and a hardware programmable logic controlled by said master processor, wherein said hardware programmable logic is configured to monitor a status of said slave processors and receive status information from said slave processors;

wherein said master processor and said slave processors are configured to run at least one virtual machine, wherein the at least one virtual machine performs the target task on the respective portions of the divided target object.

16. The system in claim 1, wherein said control unit is a circuit.

17. The system in claim 1, wherein said control unit is embodied on a separate card from said processing units.

* * * * *

UNITED STATES PATENT AND TRADEMARK OFFICE
CERTIFICATE OF CORRECTION

PATENT NO. : 8,316,439 B2  
APPLICATION NO. : 11/804494  
DATED : November 20, 2012  
INVENTOR(S) : Fang et al.

Page 1 of 1

It is certified that error appears in the above-identified patent and that said Letters Patent is hereby corrected as shown below:

On Title Page 2, in Item (56), under "OTHER PUBLICATIONS", in Column 1, Line 2, delete "EP 1392035 A2 8/2003".

On Title Page 2, in Item (56), under "OTHER PUBLICATIONS", in Column 2, Line 7, delete "WO WO 2004/019571 3/2004".

In the Specifications:

In Column 2, Line 42, delete "DESCRIPTION" and insert -- DETAILED DESCRIPTION --, therefor.

In Column 5, Line 41, delete "run ran" and insert -- run --, therefor.

In Column 5, Line 41, delete "are is" and insert -- are --, therefor.

Signed and Sealed this  
Twenty-third Day of April, 2013

Teresa Stanek Rea  
*Acting Director of the United States Patent and Trademark Office*